United States Patent [19]

Malkemes

[11] 4,096,578

[45] Jun. 20, 1978

[54] DATA SYSTEM WITH MICROPROCESSOR FEATURING MULTIPLEXED DATA TRANSFER AND REPEAT CYCLE DRIVING ARRANGEMENT

[75] Inventor: Charles David Malkemes, Boca Raton, Fla.

[73] Assignee: International Business Machines Corporation, Armonk, N.Y.

[21] Appl. No.: 752,780

[22] Filed: Dec. 20, 1976

[51] Int. Cl.² ............................................. G06F 11/08
[52] U.S. Cl. .................................... 364/900; 235/309
[58] Field of Search ... 364/200 MS File, 900 MS File; 340/146.1 BA; 235/153 AS, 309

[56] References Cited

U.S. PATENT DOCUMENTS

| | | | |
|---|---|---|---|
| 2,941,188 | 6/1960 | Flechtner | 364/900 |
| 3,436,735 | 4/1969 | Hoiseth | 364/900 |
| 3,559,179 | 1/1971 | Rhoades | 364/900 |
| 3,564,511 | 2/1971 | Restivo | 364/900 |
| 3,681,760 | 8/1972 | Salava | 364/900 |
| 3,688,274 | 8/1972 | Cormier | 364/200 |
| 3,745,531 | 7/1973 | Staas, Jr. | 364/900 |
| 3,760,366 | 9/1973 | Gregor | 364/900 |
| 3,919,690 | 11/1975 | Field | 340/146.1 BA |
| 3,936,808 | 2/1976 | O'Neill, Jr. | 364/900 |
| 3,973,242 | 8/1976 | Field | 340/146.1 BA |

*Primary Examiner*—James D. Thomas
*Attorney, Agent, or Firm*—D. Kendall Cooper

[57] ABSTRACT

A system for processing data incorporates a central processing unit and a microprocessor serving as a controller together with associated logic for controlling operation of an attached device such as a serial or line printer. Data is transferred from the microprocessor to the printer by a cable having a number of wires, reduced in number from the number required if printer is directly attached, and involving a multiplexed data transfer operation with storage latches provided in the printer for storing character image information and printer function information. Increased reliability is realized by a repeat cycle operation of the microprocessor wherein significant image or function information is sent to the printer in a succession of repetitive cycles, thus insuring accurate operation of the relatively slow magnets and driving elements in the printer.

13 Claims, 15 Drawing Figures

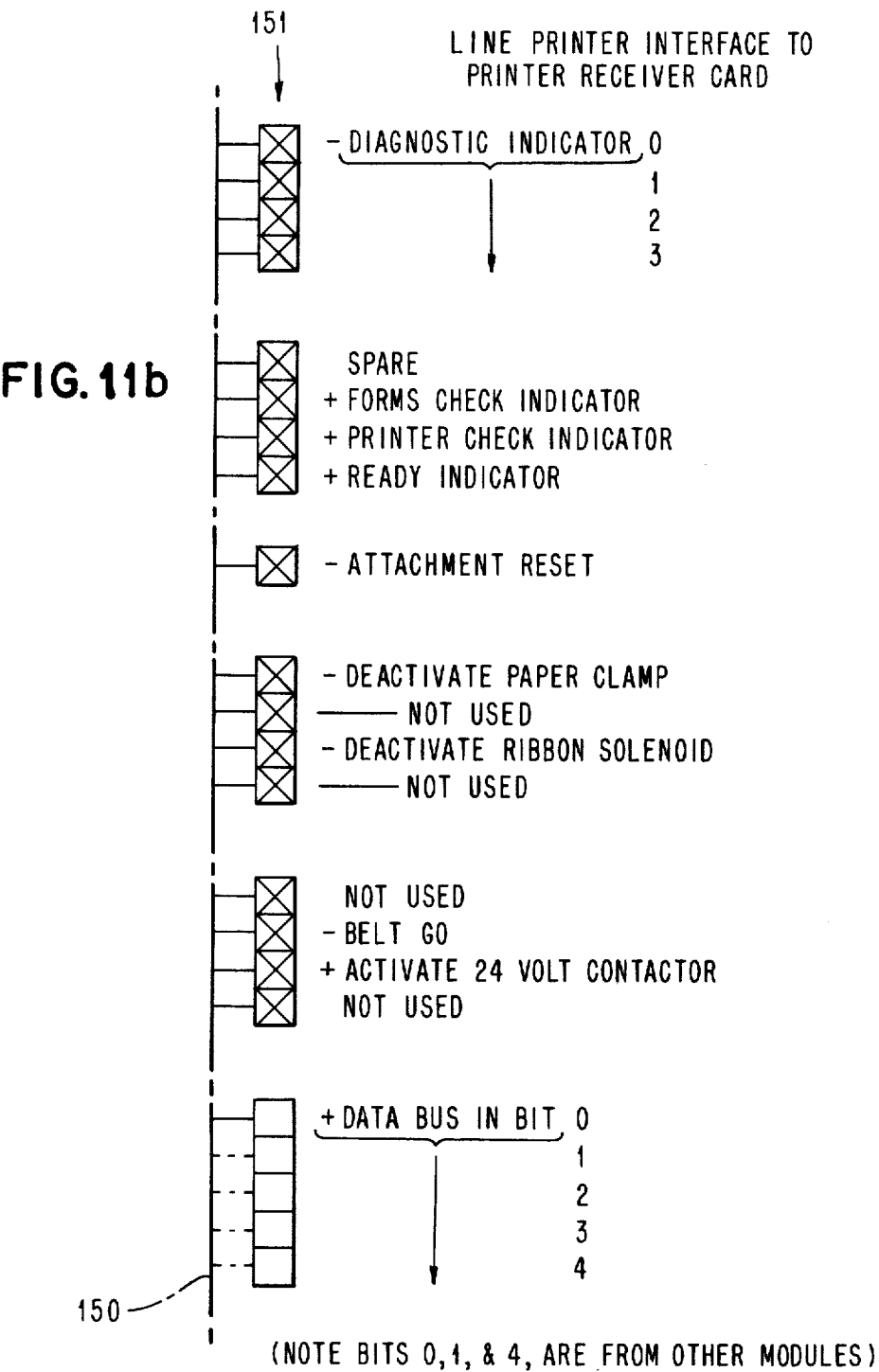

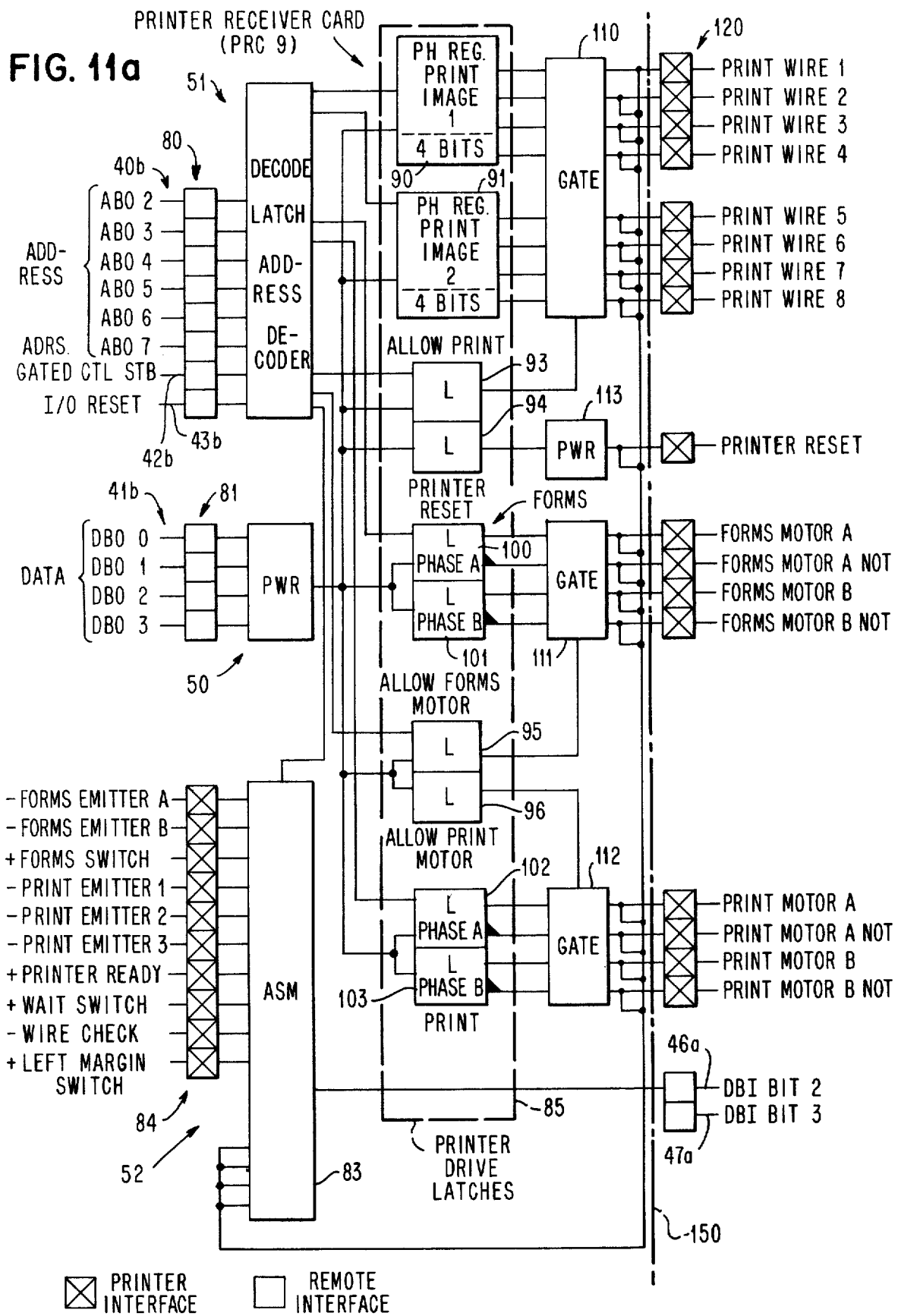

DATA SYSTEM WITH MICROPROCESSOR FEATURING MULTIPLEXED DATA TRANSFER AND REPEAT CYCLE DRIVING ARRANGEMENT

BACKGROUND OF INVENTION AND PRIOR ART

Prior systems having a controller and associated printer have ordinarily provided cable interconnection with an appropriate number of wires to handle all of the character image and function information on a one-for-one basis. That is, each bit of data has normally had its own associated wire for transfer of the data between the controller and the printer. In such circumstances, the magnets and other driving elements in the printer, such as indicators and the like, can be controlled directly and accurately since whatever signals are required can be maintained on a continuing basis.

In some systems it is desirable to economize on the cable requirements by reducing the number of wires required for transfer of data between a controlling device and the attached device, such as a printer. These arrangements require a multiplexing capability in that only portions of the data are transferred over the reduced number of wires, each portion being transmitted in a successive time interval. Also, some storage means is required in the printer in order to accumulate all of the character image and function information necessary for operation of the printer. Unfortunately, prior systems have been troubled by response of the storage members, such as latches, to noise or other spurious signals and erroneous printing or functional operation results.

SUMMARY OF THE INVENTION

In accordance with the present invention, a data system is described that incorporates a central processing unit and a microprocessor, the microprocessor being arranged to control the operation of an attached device, such as a serial or line printer. The central processing unit serves as a host processor and provides data and instructions to the microprocessor determining in a general way the operation of the microprocessor and the printer. However, much of the control programming for the printer is stored in the microprocessor. Various circuit logic is provided to achieve transfer of information to the printer and to sense actions and status of the printer in return. It will be understood that more than one microprocessor, device attachment, and associated device can be provided in the system. The principles of the present invention are applicable to a variety of attached devices, including CRT devices, keyboard devices, storage devices, and the like.

In a first embodiment, a serial, character-by-character printer is provided with character image and functional information to effect printing and functional operations of the printer, the printer incorporating latch storage elements for storing each bit of information provided by the microprocessor. The microprocessor operates at a much faster rate than the printer and the printer magnets, for example, and thus the system is arranged in such a manner that the transfer of significant print image and functional information between the microprocessor and the printer is done on a repeated, high speed basis to insure accurate operation of the printer. As an example, operation of one print cycle for the printer may comprise 600 microseconds of time. The microprocessor may have an operating interval of 100 microseconds. Of the 100 microseconds, perhaps only 16 microseconds may be required for the microprocessor to provide all significant character image and functional information to the printer in any selected 100 microsecond interval. Under the circumstances, the system is arranged so that the microprocessor transfers significant character image and functional information to the printer during each of the intervening 100 microsecond intervals on the basis of "majority rules" and important advantages are realized in the accuracy of operation of the printer. Assuming that a reduced wire cable is connected between the microprocessor and the printer, latches are then provided at the printer end of the cable in order to store the information transferred from the microprocessor during the 100 microsecond intervals. The latches are set in accordance with the familiar binary "1" if data is present and "0" if data is not present in the stream of data being transferred from the microprocessor to the printer. All latches are either set or reset during each microprocessor interval. Accordingly, a single or perhaps two spurious signals transferred from the microprocessor to the printer will prove to be inadequate to effect any significant response by the relatively slow response magnets in the printer while a stream of five of six "1" bits of data to the printer will operate the magnets in the printer in proper fashion. Accuracy is thereby insured.

In a second embodiment, a line printer is attached to the microprocessor by a similar cable arrangement but make use of a print belt having embossed characters thereon, each character requiring only one print impulse for firing and printing and the "repeat cycle" arrangement is applied in the second embodiment only to driver elements associated with indicator lamps and the like, rather than with print magnets, as in the first embodiment.

Objects

Accordingly, a primary object of the present invention is to insure accuracy of operation of devices in a data system.

Still another object of the present invention is to provide an arrangement for multiplexed data transfer between devices in a data system while insuring accuracy of response by receiving devices.

An additional object of the present invention is to provide a data processing system having a microprocessor serving as a controller of an output device, such as a printer, and incorporating more economical but highly accurate data transfer capabilities.

A further object of the present invention is to provide a data system incorporating an attached device, such as a printer, with optimized data transfer capabilities and improved accuracy of operation of the attached device.

The foregoing and other objects, features, and advantages of the invention will be apparent from the following more particular description of the various embodiments of the invention as illustrated in the accompanying drawings.

Drawings

In the drawings:

FIG. 6 incorporates a Printer Adapter Card (PAC) further illustrated in greater detail in FIG. 8 and a Printer Receiver Card (PRC) further illustrated in greater detail in FIG. 7.

Figure 1:
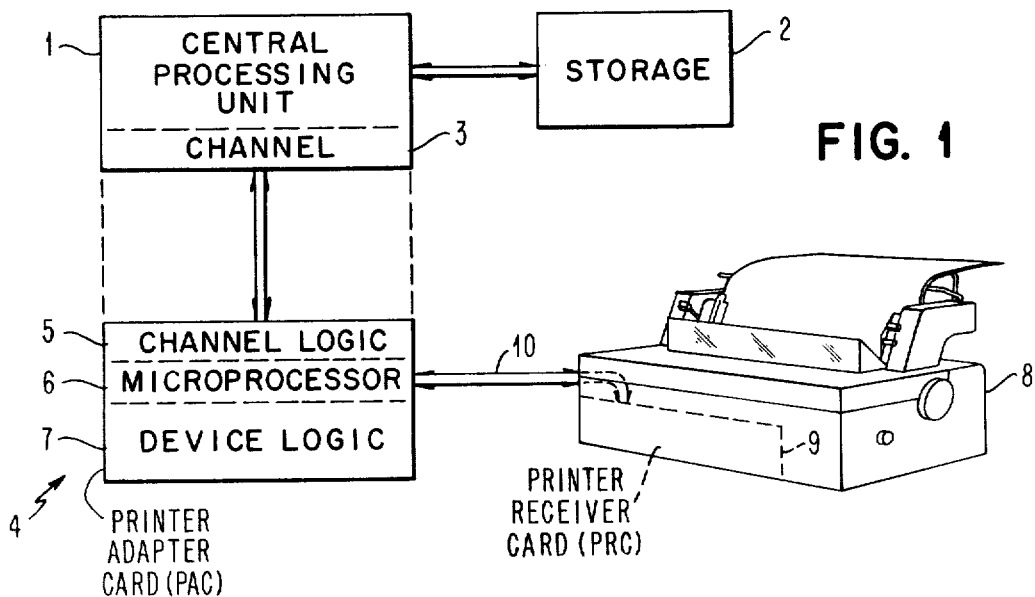
FIG. 1 is a block diagram of a data system incorporating a central processing unit and a microprocessor with attached printer and incorporating the multiplexed data transfer and repeat cycle operations in accordance with the present invention.
Figure 2:
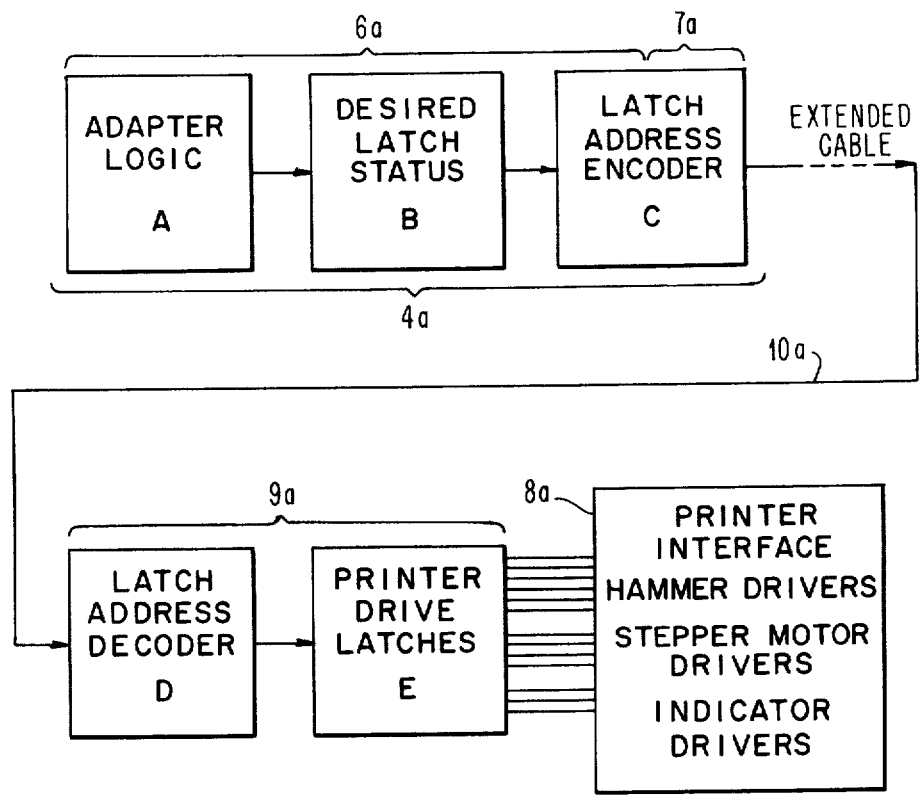
FIG. 2 is a block diagram illustrating the microprocessor and printer attachment together with interconnecting cable as exemplified by the system shown in FIG. 1.
Figure 3:
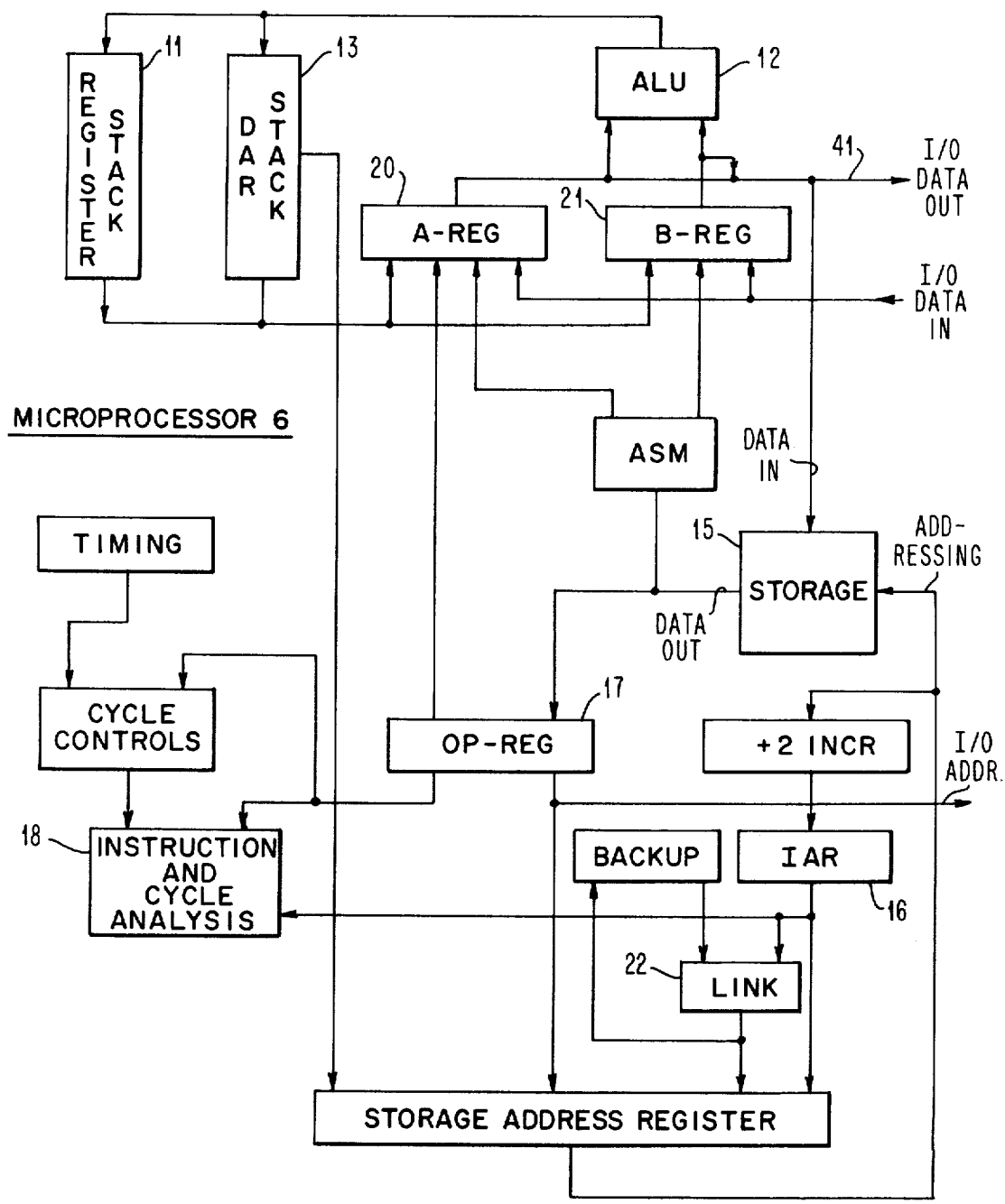
FIG. 3 is a more detailed circuit diagram of the microprocessor shown in FIGS. 1 and 2.
Figure 10A:
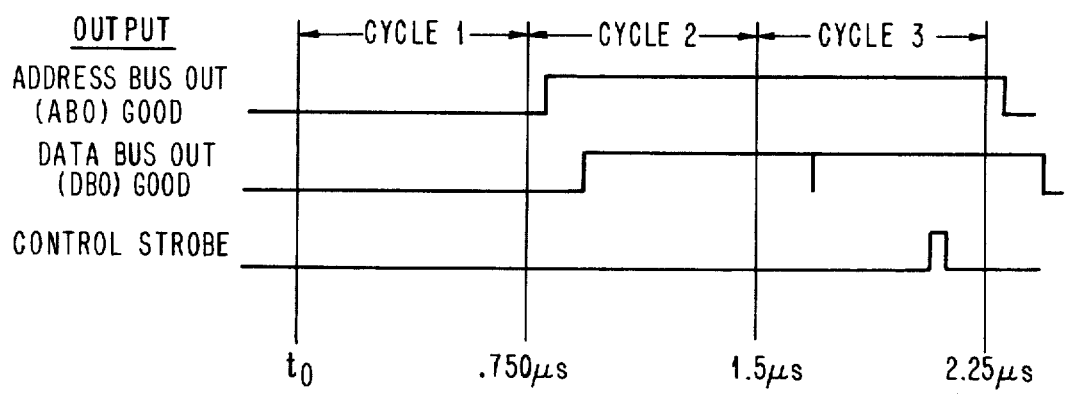
Figure 10B:
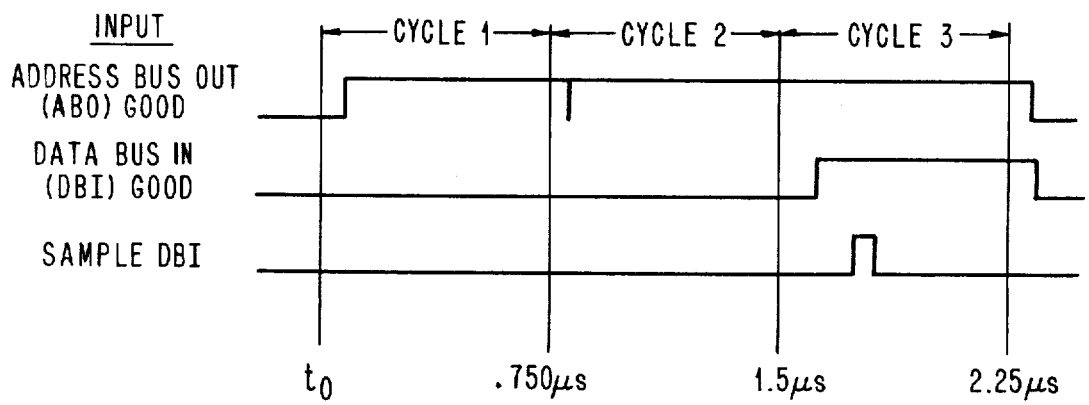
Figure 10C:
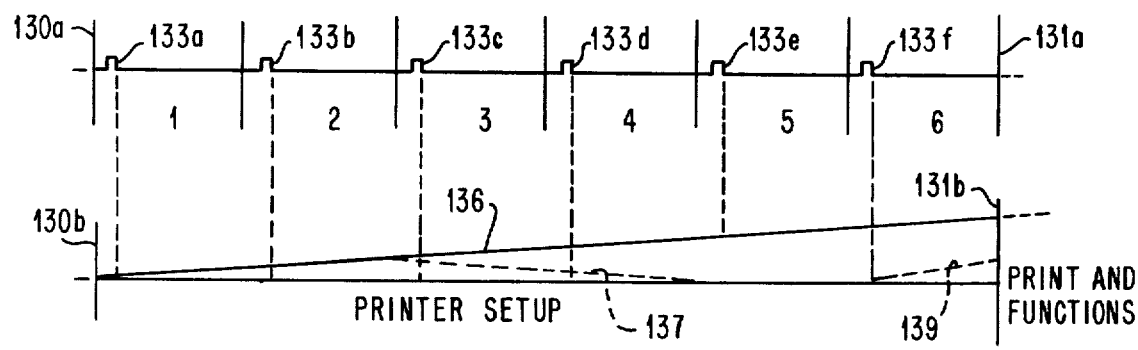

FIGS. 10a, 10b, and 10c illustrate output, input, and printer timing intervals encountered in the system of FIGS. 1, 2, and 3.

Figure 7:
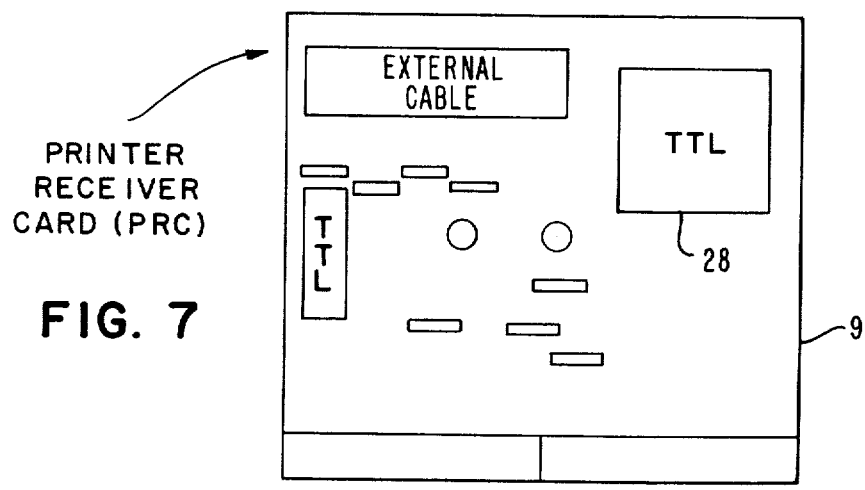

FIG. 11a illustrates various logic implemented on the Printer Receiver Card of FIG. 7 and mounted in the printer itself for effecting operation of the print wires and functional operations in the printer. FIG. 11b is intended to be substituted for a portion of the logic illustrated in FIG. 11a in order to adapt the logic of FIG. 11a for use with the second embodiment to be described herein.

Figure 12:
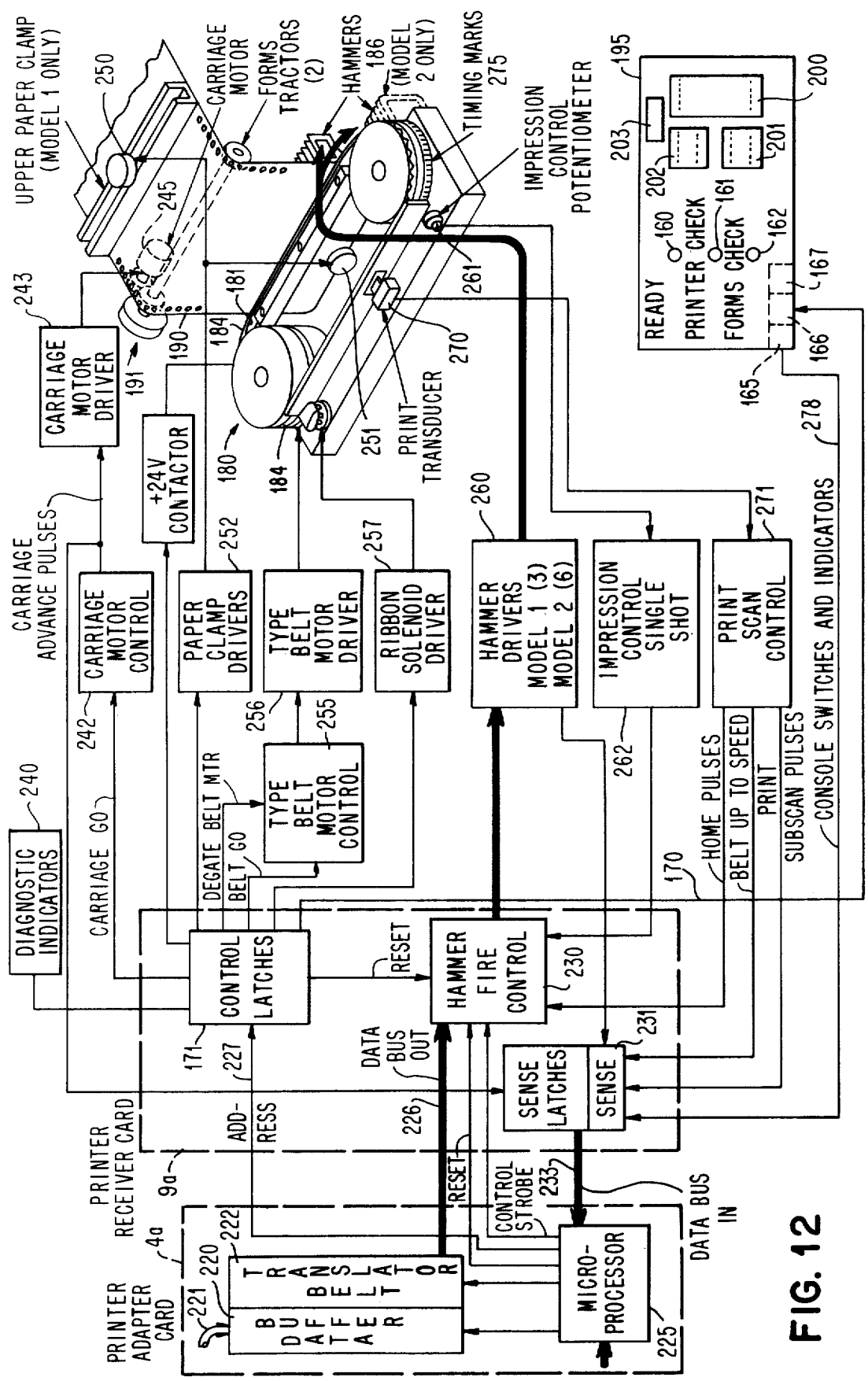

FIG. 12 illustrates diagramatically a line printer utilizing a print belt rather than print wires and having associated logic for effecting printing and functional operations. Various indicator lamps operated on a repeat cycle basis are also illustrated.

General Description of the System

The data processing system illustrated in FIG. 1 is analogous to system configurations that are possible with the IBM (Registered Trademark, International Business Machines Corporation) Series/1 System. The IBM Series/1 System is described in a variety of publications available to the general public as well as patent applications pending in the U.S. Patent Office. Central Processing Unit (CPU) 1 has associated storage 2 and channel facilities 3. Connected to Central Processing Unit 1 is a device adapter 4 comprising Channel Logic 5, a Microprocessor 6, and Device Logic 7. All of the foregoing elements 5, 6, and 7 are incorporated on a Printer Adapter Card (PAC). The device adapter 4 is interconnected by means of a cable 10 to printer 8 and more particularly to a Printer Receiver Card (PRC) 9. As previously indicated, Central Processing Unit 1 issues Input/Output (I/O) commands to printer 8 through device adapter 4 and receives status information and action completed information in return. Cable 10 as previously mentioned incorporates a number of wires which is less than the total number of significant data bits required to transfer character image information and functional information to printer 8. For purposes of familiarizing the reader with the system illustrated in FIG. 1, the Central Processing Unit together with associated input and output devices is generally characterizd as a minicomputer. The IMB 4953 Processors, Models A or B, or the IBM 4955 Processors, Models A or B, can serve the functions of Central Processing Unit 1 and associated channel 3. While they are not a one-for-one substitution, the IBM 4974 Printer, together with its attachment feature, are analagous to Printer 8 and device adapter 4. As a matter of additional information, a minicomputer Central Processing Unit like the IBM Series/1 Processors and Central Processing Unit 1 is described in the U.S. Pat. application, Ser. No. 681,953 entitled "Task Management Apparatus," filed Apr. 30, 1976, now U.S. Pat. 4,047,161 and having Michael I. Davis as inventor. Storage facilities suitable for the function of storage unit 2 in FIG. 1 herein are described in the aforesaid Davis patent application and are also available with the IBM Series/1 System. An example is the IBM 4962 Disk Storage Unit. Other devices may be substituted for printer 8 in practicing the present invention. These may include input and output devices such as described in the aforesaid Davis patent application as well as the IBM 4979 Display Station available with the Series/1 System.

Printer Attachment and Interface-General

Figure 6:
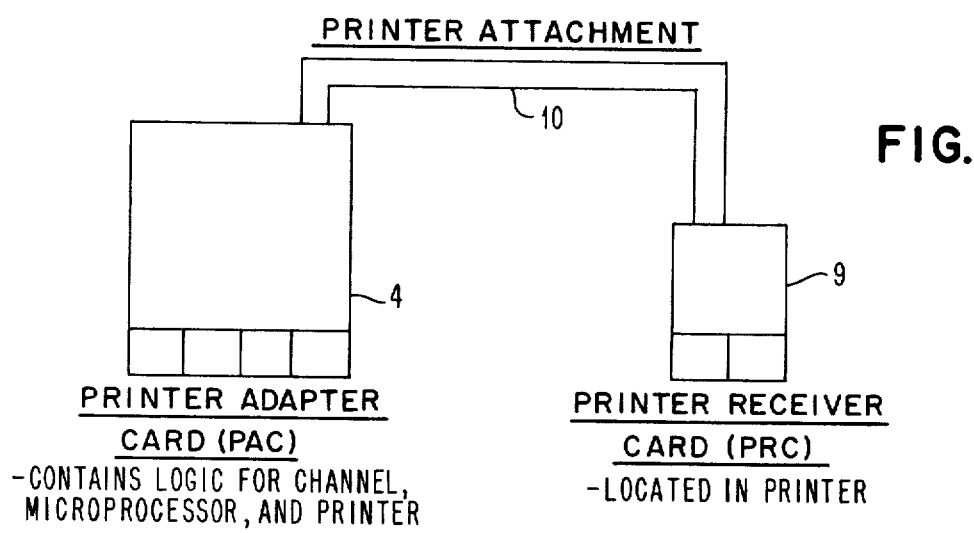
FIG. 6 illustrates a printer attachment arrangement for implementing various elements shown in FIG. 1 including channel logic, the microprocessor, device logic and printer receiver circuits.
Figure 8:
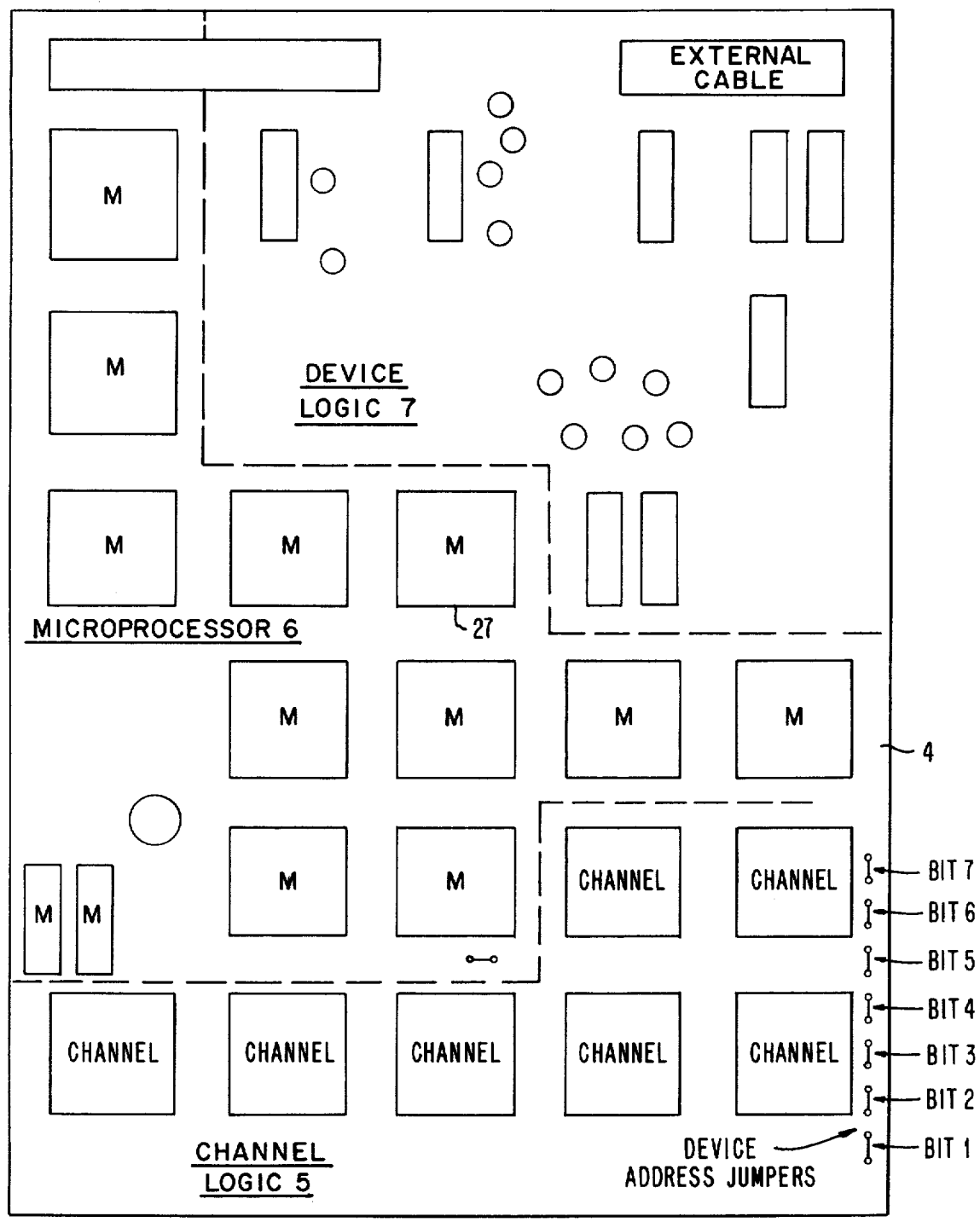

A general description of the Printer attachment and Interface is presented with reference to FIGS. 1 and 2 in particular and a brief mention of FIGS. 6, 7, and 8 at this time. Referring to FIG. 2, structures are illustrated that serve to transfer data on a multiplexed basis from the Central Processing Unit 1, FIG. 1, to Printer 8. While the elements in FIG. 2 do not exactly correspond with those in FIG. 1, they represent the control and data functions in a convenient way. Corresponding elements are given corresponding numbers. Thus, it is noted that functions found in Microprocessor 6, FIG. 1, are designated 6a in FIG. 2. This includes Adapter Logic A, Desired Latch Status B, and a portion of Latch Address Encoder C. A portion of device logic 7, designated 7a in FIG. 2, is also included in the Latch Address Encoder C block. Extended Cable 10a corresponds to Cable 10 in FIG. 1. Items on the Printer Receiver Card 9 shown in FIG. 1 include the Latch Address Decoder D and the Printer Drive Latches E all designated 9a. The actual output elements in Printer 8, designated 8a in FIG. 2, include the Printer Interface, Hammer Drivers, Stepper Motor Drivers, and Indicator Drivers.

As previously indicated, when the adapter logic is located separate from the device to be controlled (in this example a printer) it is desirable to reduce the numbr of lines connecting the device and Adapter 4. As the number of lines connecting printer 9 to Adapter 4 is reduced, the intelligence at printer 8 becomes more sophisticated.

This is accomplished economically with minimal intelligence at the printer by having a set of addressable latches located in the block B and in block E, as well. When adapter 4 determines that the state of a particular driver line in printer 8 should be changed, it merely changes the state in the desired latch status block B. The Latch Address Encoder C periodically transfers all the latch status over cable 10a to the Latch Address Decoder D. Latch Address Decoder D sets all the Printer Drive Latches E to the current desired state. If there has been no change to input status for a particular drive line, there is no change to that output.

When the period at which the Latch Address Encoder C transfers the data to the Latch Address Decoder D is short enough, such as approximately 100 microseconds, this method of driving remote magnets is excellent at rejecting noise. If any transfer is invalid due to electrical noise or if electrical noise in the printer sets or resets one or more of the Printer Drive Latches E, the erroneous condition will be corrected on the next transfer. Magnet actions involve movement of mass, and therefore are relatively slow compared to the data transfer period. The magnetic devices cannot react fast enough to be affected by occasional erroneous conditions in the Printer Drive Latches. As will be described in connection with the second embodiment, this method also applies to driving remote indicators.

Figure 4:
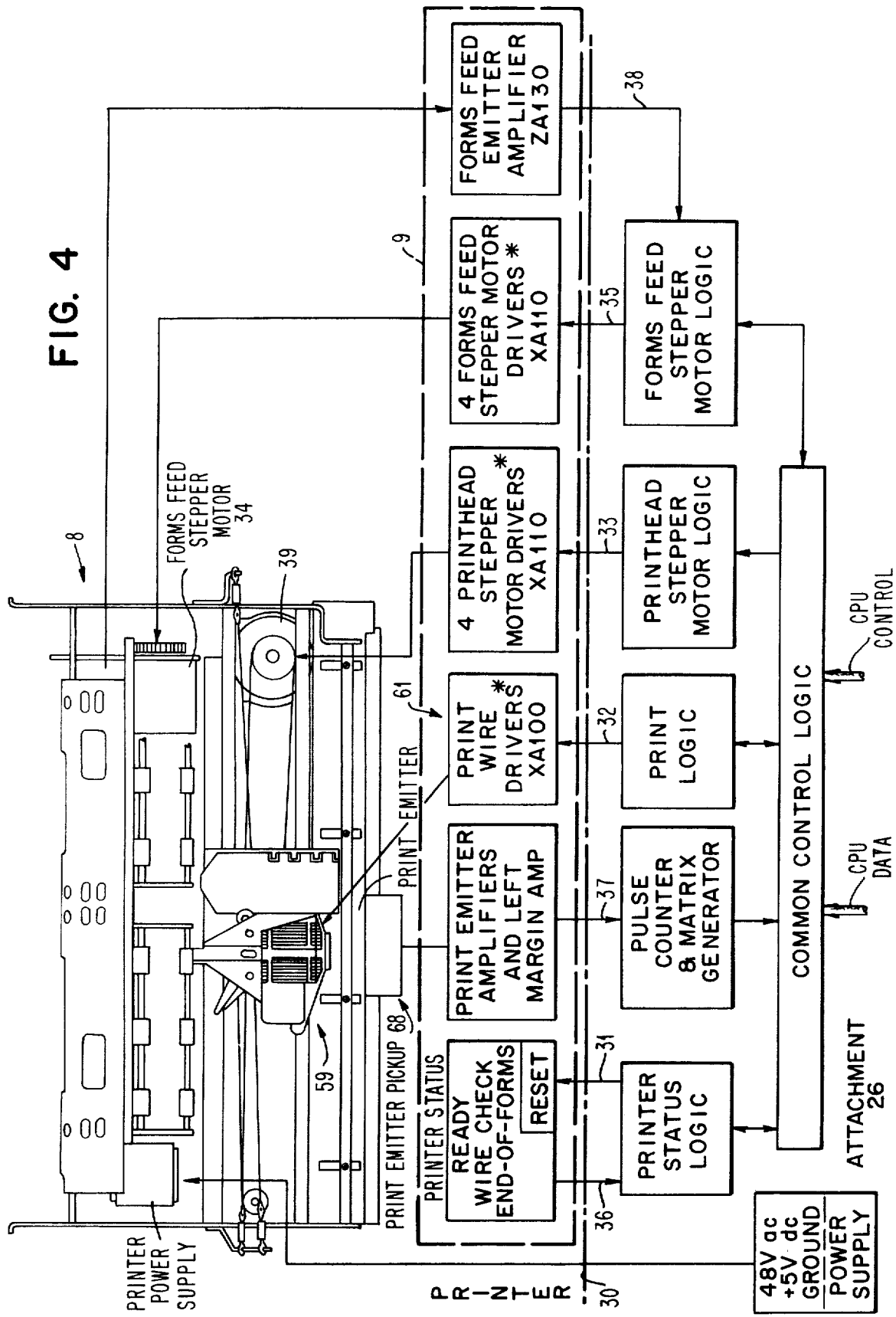
FIG. 4 illustrates in a schematic way a serial matrix printer together with blocks representative of certain printer logic involved in its operation.
Figure 5:
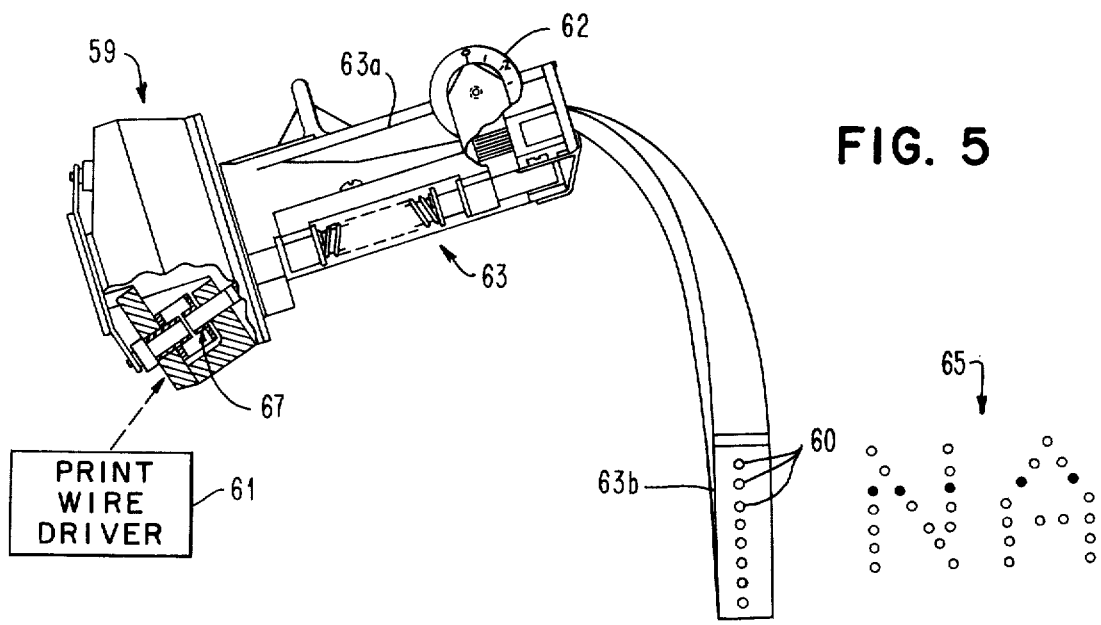
FIG. 5 illustrates a print head having a multiplicity of print wires for printing characters as illustrated together with associated print wire operating magnets.

Printer 8, FIG. 1, and the printer components 8a, FIG. 2, are shown in greater detail in FIGS. 4 and 5. Various members comprising Printer Adapter 4 as well as the Printer Receiver Card 9 are illustrated in FIGS. 6, 7, and 8 which will be described in greater detail shortly.

Microprocessor

FIG. 3 shows the microprocessor data flow and components. I/O data coming into the microprocessor goes to the Register Stack 11 and I/O data leaving comes from Stack 11. The contents of two registers, both from the Stack 11 only, or one from Data Address Register (DAR) Stack 13 and one from Stack 11, may be sent into the A Register 20 and B Register 21, respectively, and through the Arithmetic Logic Unit (ALU) 12 and the results placed in either Stack 11 or DAR Stack 13. The ALU functions are ADD, SUB, AND, OR, and XOR. In addition, Move and Test functions may be performed.

Data from Storage 15, as addressed by DAR Stack 13 or absolute from the instruction, may be placed in the Stack 11 or if read-write Storage 15 is used, data from the Stack 11 may be written to storage. All data storage operations use two nibbles (4 bits each) so that full bytes are handled.

Instructions, as addressed by Instruction Address Register (IAR) 16 are placed in the Operation (Op) register 17. All instructions are 16 bits wide. A Branch address may originate from the Immediate data in the instruction or from the DAR Stack 13 or from the registers in Link block 22.

The microprocessor starts after a Reset, or Power On cycle, by fetching the first instruction of the "day". This first cycle is the only one during which no instruction execution takes place. From that cycle on, the microcontroller is fetching one instruction ahead and while executing the present instruction. This overlap makes efficient use of every storage cycle so that the storage cycle time also becomes the instruction cycle time.

Two types of instructions reference Storage 15 themselves. They are the "Load" and "Store" to memory instructions. Since these instructions must take two cycles to complete and it is desired not to waste storage cycles, one of the two cycles is overlapped between the next instruction fetch and the handling of data associated with the instruction.

Each two-cycle instruction will be discussed separately. First, and the simplest, is the "Load" instruction. The Load instruction is used to load one byte of data from Storage 15 into the Register Stack 11. The execute part of the instruction can be separated into two parts. One, a storage cycle to fetch the data; and two, a cycle to address the Register Stack 11, and store away the data. The second cycle does not address storage so it is ideal for fetching the next instruction. This allows storage to be efficiently referenced during both cycles. At the end of the second cycle, not only will the data be put away but the next instruction will have been fetched and ready for execution.

So, the "Load" instruction references storage two times. First, for the data associated with the load and second, for the next instruction fetch.

The "Store" instruction is used to take one byte of data from the Register Stack 11 and store it into Storage 15. The execute part of the instruction requires a cycle first to be taken to get the data from the Register Stack 11 then a cycle is taken to put the data into Storage 15. Storage is not used during the first cycle of this instruction. To make efficient use of I/E overlap the next instruction must be fetched during the first cycle.

At the end of the first cycle of every "Store" instruction the next instruction is placed into the Operation register 17, just as normal, and the second cycle is begun. A latch, not shown, is set by Instruction and Cycle Analysis block 18 and its set state is remembered by block 18 to prevent the premature execution of the next instruction during the second cycle of the "Store" instruction itself, which has been wiped out by storing the next instruction in the Operation register 17.

Toward the end of the second cycle of the "Store" instruction a second latch, not shown, is set. Its function is to prevent the normal loading of the Operation register 17, since it already contains the next instruction. When the second latch is turned off at the end of the Second cycle, the microprocessor once again is allowed to decode the Operation register 17 and the next instruction is allowed to proceed.

Basic Data Flow

FIG. 4 is a diagram of Printer 8 incorporating various items shown above line 30 and Attachment 26 including items generally located below line 30. FIG. 4 shows the interactions between Printer 8 and the Attachment 26 items including the Printer Adapter Card 4, Printer Receiver Card 9, cable 10, and microprocessor 6. The Attachment items supply Printer 8 with the following signals. A reset signal on line 31 resets the wire check latch in the printer. Print wire signals on line-set 32 fire the print magnets. Printhead stepper motor signals on line-set 33 move the printhead left or right along the print line. Forms feed stepper motor signals on line-set 35 advance the forms to the next line or eject the form.

The Printer 8 supplies the Attachment 26 with the following. Printer status on line set 36 such as: a ready signal that tells the attachment that the printer is operational; a wire check signal that tells the attachment that a print magnet driver is on too long; and an end-of-forms signal that tells the attachment if forms are present or not. Print emitter signals and a left margin signal on line-set 37 are used by the attachment to determine where the printhead is positioned on the print line and which direction it is moving. Forms feed emitter signals on line-set 38 are used by the attachment to determine how far the forms have advanced.

The serial matrix printer typically operates at 120 characters per second (cps), prints up to 132 characters per line, prints 10 characters per 2.54 cm (one inch) with a maximum line length of 33.5 cm (13.2 inches), prints six lines per 2.54 cm (one inch), and spaces or skips six lines per 2.54 cm (one inch) with a maximum of 84 lines per command.

Operator Controls

Reference is made to the IBM Maintenance Library Manual concerning the 3715 Printer, Theory-Maintenance, SY34-0036-2 for various characteristics that are analogous to the Printer herein, including certain of the switches that are not shown herein in the drawings but that are completely illustrated in the aforesaid manual.

Printer 8 has no keyboard, keys, or lights. It does have several controls, similar to those of a typewriter, for moving and adjusting paper and forms. In addition a mode switch and a power switch are located on rear corner of the printer. The power switch turns the printer ON and OFF.

Mode Switch

This switch (not shown) has three positions: Print, Wait, and TOF (Top of Forms). For normal operation the switch is in the Print position.

Print

The printer is available for execution of system commands. If no system commands are issued within approximately a 6 second period, the attachment moves the printhead to the extreme left position.

Whenever the switch is returned to the Print position, and conditions are satisfactory for printing, the attachment calibrates the printhead position.

Wait

The printer is no longer available for executing system commands. The current command is completed and all printer action is stopped. Once the current command is completed, the printer will ignore any forms or printhead movement. In Wait, forms can be moved manually for alignment.

TOF (Top of Forms)

The printer is not available for execution of system commands. The attachment assumes the position of the forms to be line one. As long as the switch is in TOF, the forms position will be line one regardless of manual forms movement. This allows for manual alignment to the top of the form.

Adapter 4

Adapter 4, FIGS. 1, 6, 8, and 9, serves as the connector between the CPU 1 I/O channel and Printer 8.

As illustrated particularly in FIG. 8, card 4 is sectionalized into three primary areas. These are assigned to the channel logic 5, the microprocessor logic (M) 6, and device logic 7. These areas accommodate circuit chips, such as chip 27.

Adapter 4 transfers characters from the main storage 2 and converts them into the corresponding dot matrix to be printed. The system's program can define, through the Adapter, the length of the forms and the overflow line on the form. When the overflow line is reached, forms movement and printing is stopped, and an exception interrupt is given. Forms movement and printing can be resumed on the next start command. The attachment can cause the printer to skip to any line on the form and space up to 84 lines per command.

Adapter 4 serves as the connector between the processor I/O channel 3 and Printer 8 and performs the following functions:

1. Interprets and executes commands from the channel.
2. Provides a path for data between the channel and the printer.
3. Transfers data in parallel one or two bytes at a time.
4. Furnishes status information to the channel and reports condition codes after I/O instructions and during interrupts.
5. Checks the accuracy of transferred data.
6. Converts characters from storage into character matrix dots.
7. Selects direction of printing by determining which end of the line to be printed is closest to the present printhead position.

Adapter Data Flow

The adapter card handles data as follows:

Data/Address Registers. Hold data being transferred to and from main storage. Command information is moved into them to control printer operations. The address register is used mainly for cycle steal.

Microprocessor 6. Controls all printer operations, performs tests on conditions and status, and presents interrupt requests.

Print Data Buffer. Holds one line of data to be printed (maximum of 132 characters). Characters are stored in eight bit EBCDIC (Extended Binary Coded Decimal Interchange Code) and are transferred from main storage two bytes at a time.

Wire Image Buffer. Generates printed characters by determining which print wires should be fired to form the character dots.

Channel Logic 5. Passes signals back and forth between the processor and the attachment to control the direction and type of data flow.

Adapter Interface Lines

Figure 9:
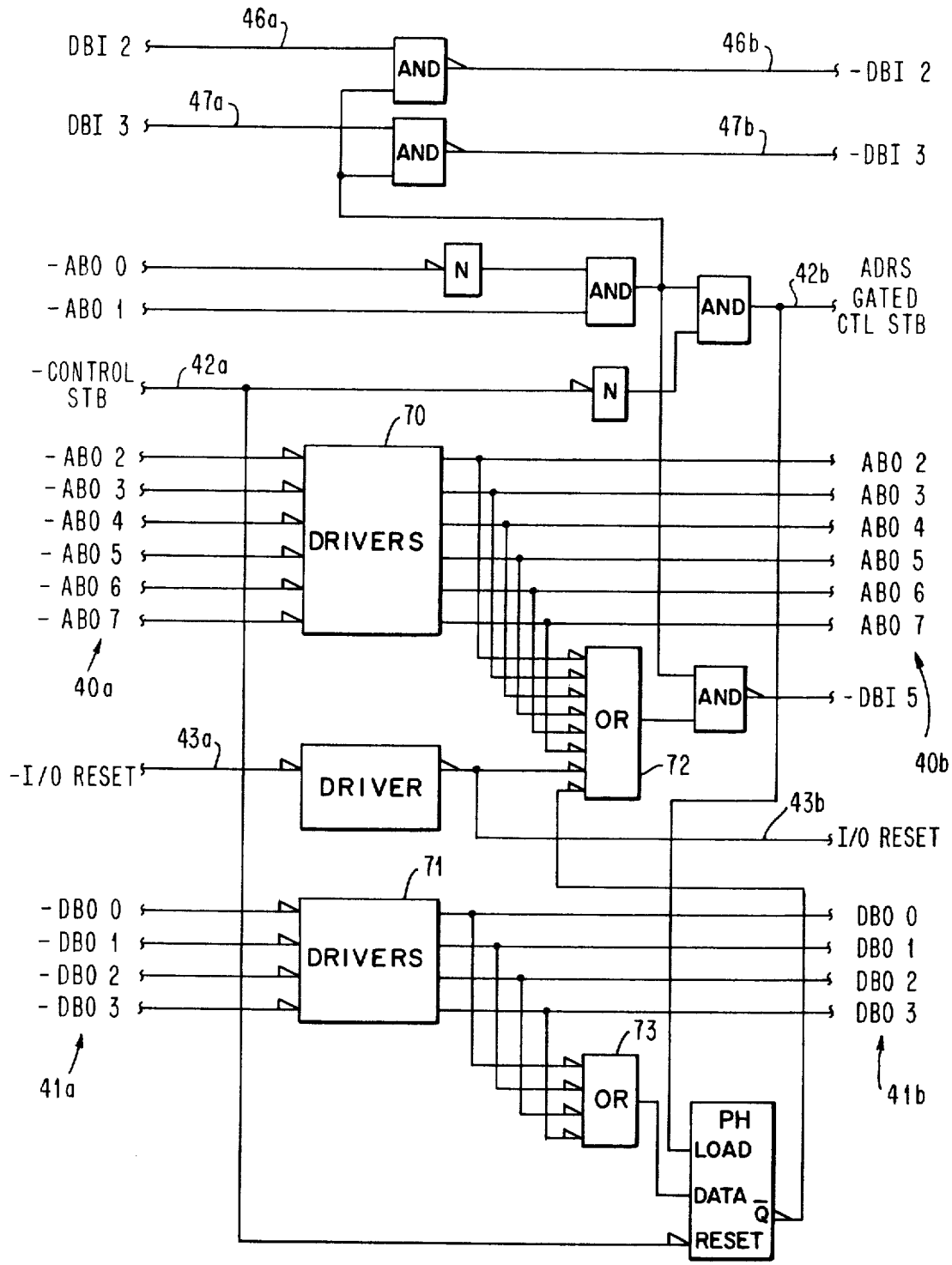
FIG. 9 illustrates device logic incorporated on the Printer Adapter Card of FIG. 8.

Adapter 4, FIG. 9, provides to the printer:

Address Bus Out (ABO) lines 40b.

(6) — Digital levels provide coding to select the printer functions to be performed or printer signals to be sensed.

Data Bus Out (DBO) lines 41b.

(4) — Digital levels on these lines start and stop the selected printer functions. Print wire images are also set by these lines.

Control Strobe (CS) lines 42b.

(1) — A digital strobe pulse is provided to gate data to the printer from the buses.

I/O Reset lines 43b.

(1) — A digital reset pulse is provided to the printer with any I/O Power On Reset, System Reset, Halt I/O, or Device Reset to the attachment from the processor.

The attachment receives from the printer:

Data Bus In (DBI) lines 46a and 47a (2) — Digital levels on these lines are sensed by the attachment from selected printer signal lines.

Printer Receiver Card 9.

Card 9, FIGS. 7 and 11a, drives the control lines to the printer and senses the output signals from the printer. As illustrated especially in FIG. 7, card 9 has several circuit chips, such as chip 28, comprising transistor-transistor logic (TTL). In FIG. 11a, signals used to select printer functions are repowered by drivers 50. The printer functions to be performed are selected and sensing signals are gated onto the Data Bus In by decode circuits 51. Printer status and advisory signals are selected for return to the attachment in area 52.

Print Magnet Drivers 61

Eight drivers are used to repower drive signals to the eight print wires and provide a signal if any print wire is on too long.

Stepper Motor Drivers Card 29

Four drivers are used to repower drive signals to the forms stepper motor. Four other drivers are used to repower drive signals to the print stepper motor.

Stepper Motors

Two stepper motors are used. A forms feed stepper motor 34, FIG. 4 drives the forms feed mechanism. A printhead stepper motor 39, FIG. 4, drives the printhead carrier. Physical characteristics of both motors are identical. Both motors are under control of Adapter 4.

The sequence of the phase pulses from the adapter controls direction of rotation. Each motor is controlled by four drive lines: A, $\overline{A}$, (NOT A), B, $\overline{B}$ (NOT B). The speed of each motor is determined by the frequency of the input phase pulses. The direction the motor turns is determined by the sequence of the control pulses; each time the phases are shifted, the motor shaft rotates 2 degrees.

Print Emitter and Print Emitter Pickup 68

Circuit boards are used by the printer 8 to generate print emitter signals and the left margin signal.

Printhead 59

The printhead 59, FIGS. 4 and 5, has eight wires 60 that are arranged vertically in the printhead. Each print wire 60 is actuated by a print wire driver such as driver 61, actuating a print coil, such as coil 67. The print wire drivers are turned on by Adapter 4. The printhead movement along the print line is caused by the printhead stepper motor 39 under control of Adapter 4. The copy control dial 62 adjusts the printhead for various form thickness. FIG. 5 shows a side view of the printhead and one portion 63a of wire guide 63 and an end view of another portion 63b of the wire guide 63. The print pattern is shown at 65.

Data Transfer

Printer operations are initiated from operate I/O instructions issued by the processor. Control and data information are controlled by the Printer Adapter 4.

Single data transfers move one or two bytes of data to or from the attachment during execution of an operate I/O instruction. Multiple data transfers are started by an operate I/O instruction and completed under control of the cycle stealing attachment.

Characters to be printed are transferred from main CPU 1 storage 2 in eight bit coded EBCDIC. They are converted into the corresponding dot matrix stored in the wire image buffer in the attachment. Up to 132 bytes (two at a time) are transferred from main storage 2 to the attachment for printing one line of data.

The printer responds to two types of data transfer: direct program control (DPC) and cycle steal (CS).

Direct Program Control (DPC)

An I/O command executed under direct program control, transfers one word to or from an immediate data control block (IDCB), immediate data field in main storage. The processor cannot continue with other processing operations until the immediate data field has been moved to or from main storage and the transfer cycle is complete.

DPC commands for the printer are:
Prepare
Device Reset
Read Device ID

Cycle Steal

After the printer has accepted a cycle stealing I/O command, additional data transfers to or from main storage are made by stealing storage cycles from the processor. Processor and printer operations are then able to overlap. Overlapping allows the processor to continue with other processing operations while the printer is executing an I/O operation.

CS commands for the printer are:
Start I/O
Start Cycle Steal Status
Start Diagnostic

Prepare Command

Before the printer, via the attachment, can execute interrupt types of commands, it needs interrupt parameters which control these commands. These parameters, stored in the IDCB immediate data field associated with a Prepare command, contain the level on which the attachment is to interrupt and an interrupt enable.

The Prepare command operates under command of the Central Processing Unit and does not itself cause an interrupt.

Device Reset Command

The Device Reset does not use or check the immediate data field of the IDCB. The command code and device address supply all needed information.

Read Device ID Command

The Read Device ID command operates under DPC and transfers the device ID word for the printer into the immediate data field of the immediate device control block (IDCB) associated with that command. If the printer is busy or an interrupt is pending, condition code 1 is returned. No interrupt results from the command.

Start I/O Command

When the processor issues a Start I/O command to the printer, bits 0–15 of the IDCB are transferred into the attachment address register, and checked for errors and validity. Bits 16–31 define the main storage location of the DCB which contains the parameters required for the particular command. Once the command is interpreted and accepted, the attachment cycle steals from main storage the contents of the DCB control word associated with the Start I/O command and the processor continues with other processing. Subsequent action is dependent upon the control parameters found in the DCB table. If the information given the printer is acceptable (error free), the attachment responds with condition code 7 (satisfactory). An end interrupt is given to the processor when the attachment has executed the command. All start cycle steal operations will cause the attachment to go busy. The attachment will post the appropriate end interrupt at the completion of the operation.

Device Control Block (DCB)

The DCB words associated with a Start I/O command must have the following format:

DCB Word 0—Control Word

The control word is the first word of the DCB. It is a 16 bit word that explains the cycle stealing operation, and contains two distinct bytes of control parameters to be used with the particular Start command to be performed.

Bits 1, 3 and 4 of the control word are not used and should be zero.

Commands/Operations

Bit O — Chaining Flag

This bit indicates a command chaining operation. After completing the current DCB operation, the attachment will not interrupt but will fetch the next DCB pointed to by the chain address in DCB word 5.

Bit 2 — Input Flag

This bit indicates the direction of the cycle steal operation: 0 = into main storage.

Bits 5, 6 and 7 — Address Key

This is a three bit key presented by the attachment during data transfers to ascertain storage access authorization.

Bits 8 through 15 (the second byte of the control word) are device dependent.

Bit 8 — Forms Parameter Bit

This bit is an indicator telling whether forms parameters are available in word 1 of the DCB. If this bit = 0, word 1 of the DCB is not used. If this bit = 1, word 1 of the DCB contains new forms parameters.

Bits 9, 10, and 11 are mutually exclusive. If more than one of these bits are detected in the same DCB control word, an exception interrupt with a DCB specification check is reported. For printing to take place, bits 9, 10 and 11 must be zero.

The Adapter 4 provides the facility to load the wire image buffer with the standard 64 character EBCDIC set, to overlay some of these characters with special characters and symbols, or for the system user to load his own character set. Bits 9 and 10 control the selection of these facilities.

Bit 9 — Initialize Wire Image Buffer

When this bit is on, the attachment will initialize its wire image buffer (WIB) during which no printing or forms movement takes place. There are two ways the WIB is initialized:
1. Byte Count = 0—The attachment initializes its WIB with the standard 64 character EBCDIC set.
2. The Byte Count = eight or less—The attachment initializes its WIB the standard 64 character set and then overlays characters in the table with alternative characters specified by the eight bytes of data transferred.

Bit 10 — Wire Image Transfer

When this bit is on, the data transferred between main storage and the attachment is in the wire image table. No printing takes place while this bit is on.

Bit 11 — Diagnostic

When this bit is on, the data transferred between main storage and the attachment will be diagnostic information. The attachment will transfer data between main storage and the diagnostic address of the attachment specific in DCB word 4. If the input flag bit = 0, the attachment will branch to the last diagnostic address accessed, when the byte count goes to 0.

Bits 12 through 14 — Not used or checked

Bit 15 — Retry

When this bit is on, the attachment will attempt to complete execution of the last Start I/O command issued.

DCB Word 1—Forms Parameters

This word is not used if bit 8 of the DCB control word = 0. If this bit = 1, word 1 is used for forms parameters.

DCB Word 2—Forms Control

The forms control word specifies whether a skip or space is to take place. For a skip, the attachment calculates how far the forms must be moved to get to the specified line. To space, the modifier indicates the number of lines to move. The speed of the forms movement is the same regardless of the modifier used.

The maximum number of lines the forms should be moved with either a skip or space command is 84. When more than this distance, 35.6 cm (14 in.), is moved in one operation, stacking and feeding problems occur.

DCB Word 3—Not Used

DCB Word 4—Diagnostic Address

When the diagnostic bit (11) is set in the DCB Control word, DCB word 4 contains the address in the attachment where the diagnostic data transfer is to take place.

DCB Word 5—DCB Chaining Address

This is the address of the next DCB to be fetched if the chaining flag (bit 0) is on.

DCB Word 6—Byte Count

If the byte count = 0, no data is transferred.
If the byte count is greater than the maximum allowed for a particular operation, an interrupt is posted and a DCB specification check is set in the ISB.
The attachment stops cycle stealing when the byte count goes to zero.

DCB Word 7—Data Address

This word contains the storage address for the data associated with the operation to be performed.

Printhead Stepper Motor Timings

The attachment pulses four printer input lines (printhead predrivers A, $\overline{A}$, B, and $\overline{B}$) in a sequence to start printhead motion, move the printhead left-to-right or right-to-left, and stop printhead motion.

Start and Stop Sequence

The motor is started gradually and slowed down to stop. At the beginning (start) and ending (stop) of printhead motion, the printhead stepper motor must be detented for a settle time. This ensures that the printhead has stopped all motion and will move correctly when the printhead stepper motor is restarted. When power is first applied, the printhead predrivers A and B are activated by the attachment for 50 ms.

To stop the printhead movement, the printhead stepper motor must go through a stop sequence, which includes slowing the motor down and detenting it for a settle time. The settle time is normally 50 ms. Up to 100 ms settle time can take place during a forms movement. Other than a power on sequence, the start sequence can begin on any of the four active printhead predriver conditions (AB, $\overline{A}$B, $\overline{AB}$, A$\overline{B}$), but the active start conditions must be the same as the previous settle time.

Move Printhead Left-to-Right

To advance the stepper motor clockwise and move the printhead left-to-right, the printhead predrivers are sequenced on and off in the sequence $\overline{AB}$, A$\overline{B}$, AB, $\overline{A}$B. Up-to-speed motor advances are sequenced 2.15 ms apart.

Right Margin Stop

When moving the printhead left-to-right, the attachment must initiate a stop sequence immediately after character position 132 to ensure the printhead does not contact the mechanical stop in the right margin.

Move Printhead Right-to-Left

To advance the printhead stepper motor counter-clockwise and move the printhead right-to-left, the printhead predrivers are sequenced on and off in the reverse sequence $\overline{A}$B, AB, A$\overline{B}$, $\overline{AB}$. The start and stop timings are the same as then moving the printhead left-to-right.

Multiplexed Data Transfer and Repeat Cycle Operation

The principles of operation of the present invention as implemented in the first embodiment will be apparent from analysis of FIGS. 9 - 11a in connection with the following Tables A through G. It will be recalled that FIG. 9 relates to the Printer Adapter Card but more especially the Device Logic 7 while FIG. 11a relates to the logic provided on the Printer Receiver Card 9. FIGS. 10a, 10b, and 10c illustrate some of the timing considerations involved. Tables A through G provide details concerning abbreviations, operation codes and similar information with Table G being of particular interest as showing a single microprocessor setup interval for determining the printer wire image and the printer functional operations. This interval comprises 21 microprocessor cycles as indicated in Table G.

It will be understood that the principles of operation as described in connection with printer magnet setup are applicable to the operation of other devices such as Indicators as will be apparent from a description of the second embodiment making use of essentially the same figures, that is, FIGS. 9, 11a plus FIGS. 11b and 12.

TABLE A

| ABBREVIATIONS | |
|---|---|
| Abbreviation | Definition |
| ABO | Address Bus Out |
| ADRS | Address |
| ALU | Arithmetic Logic Unit |
| AND | And Circuit |
| ASM | Assembler |
| CTL | Control |
| DAR | Data Address Register |
| DBI | Data Bus In |
| DBO | Data Bus Out |
| GATE | And Circuits |
| IAR | Instruction Address Register |
| I/O | Input/Output |
| INCR | Incrementer |
| M | Microprocessor Logic |
| N | Inverter |
| OP | Operation |
| OR | OR Circuit |
| PH | Polarity Hold |
| PWR | Power |
| REG | Register |
| STB | Strobe, Control |
| TTL | Transistor-Transistor Logic |

TABLE B

| MICROPROCESSOR LABELS/DEFINITIONS | | |
|---|---|---|
| Label | Address | Definition |
| PIMG1 | /9F | Print Wire Image High |
| PIMG2 | /AF | Print Wire Image Low |
| CPRTS | /B7 | Print Head Stepper Drive Address |
| CFRMS | /BB | Forms Phase Control Address |
| CSPRS | /BD | Stepper On/Off Control Address |
| CPARS | /BE | Print Allow and Reset Address |
| * | R0 | Input/Output Register |
| * | R1 | Input Output Register |

TABLE C

| MICROPROCESSOR OPERATION (OP) CODES | |
|---|---|
| Op Code | Operation |
| LD | Load |
| LDA | Load Absolute |
| M | Move |
| OUT | Output Data in R0 |
| T | Test |

TABLE D

| MICROPROCESSOR CONTROL REGISTER ASSIGNMENTS | | | |
|---|---|---|---|
| Control Register | | Assigned Register | Definition |
| CREG2 | EQU | D13 | Control Register 2 |
| ALFMS | EQU | /1 | Allow Forms Stepper |
| * | Bit 3 | | 1 = Allow Print Stepper |
| ALPTS | EQU | /2 | Allow Print Stepper |
| * | Bit 2 | | 1 = Allow Forms Stepper |
| * | Bit 0, 1 | | Form Stepper Phases |
| CREG1 | EQU | D15 | Control Register 1 |
| MREST | EQU | /1 | Minus Reset |
| * | Bit 3 | 1 = Reset | Off |
| ALPRT | EQU | /2 | Allow Print Wires To Fire |
| * | Bit 2 | | 1 = Print Allow |
| * | Bit 0, 1 | | Print Stepper Phases |

TABLE E

| PRINTER CODES AND FUNCTIONS | | | | | | | | | | | | | | |
|---|---|---|---|---|---|---|---|---|---|---|---|---|---|---|
| Address Bus | | | | | | | | Output Hex | Data Bus | | | | Output Hex | Control Function |
| 0 | 1 | 2 | 3 | 4 | 5 | 6 | 7 | | 0 | 1 | 2 | 3 | | |
| 1 | 0 | X | X | X | X | X | 0 | BE | X | X | X | 0 | E | Turn Off Printer Reset |
| | | | | | | | | | X | X | 0 | X | D | Turn On Print Allow |
| | | | | | | | | | X | 0 | X | X | B | Turn On Printer Reset |
| | | | | | | | | | 0 | X | X | X | 7 | Turn Off Print Allow |
| 1 | 0 | X | X | X | X | 0 | X | BD | X | X | X | 0 | E | Turn On Forms Stepper |
| | | | | | | | | | X | X | 0 | X | D | Turn On Print Stepper |
| | | | | | | | | | X | 0 | X | X | B | Turn Off Forms Stepper |
| | | | | | | | | | 0 | X | X | X | 7 | Turn Off Print Stepper |
| 1 | 0 | X | X | X | 0 | X | X | BB | X | X | X | 0 | E | Turn On Forms Drive A |

TABLE E-continued

PRINTER CODES AND FUNCTIONS

| Address Bus | Output Hex | Data Bus | Output Hex | Control Function |
|---|---|---|---|---|
| | | X X 0 X | D | Turn On Forms Drive B |
| | | X 0 X X | B | Turn Off Forms Drive A |
| | | 0 X X X | 7 | Turn Off Forms Drive B |
| 1 0 X X 0 X X X | B7 | X X X 0 | E | Turn On Print Drive A |
| | | X X 0 X | D | Turn On Print Drive B |
| | | X 0 X X | B | Turn Off Print Drive A |
| | | 0 X X X | 7 | Turn Off Print Drive B |
| 1 0 X 0 X X X X | AF | -(image) | 0-F | Set Print Wire Image 5-8 |
| 1 0 0 X X X X X | 9F | -(image) | 0-F | Set Print Wire Image 1-4 |

NOTE: X signifies that a particular bit is not used in the function being defined; however, functions may be combined by letting desired X's = 0 and thus executing multiple functions with one command.

TABLE F

LOOKUP TABLE

```
OUTGN   EQU    *    TABLE FOR GENERATING OUTPUT COMMANDS
        DATA   /3363,/93C3,/3666,/96C6
        DATA   /3C6C,/9CCC,/3969,/99C9
```

TABLE G

MICROPROCESSOR - SETUP OF PRINTER

| Microstep | Op Code | Registers | Action |
|---|---|---|---|
| | | | REFRESH WIRE IMAGE |
| 1, 2 | LDA | IMAGE | LOAD WIRE IMAGE |
| 3 | OUT | PIMG1 | OUTPUT IMAGE BITS 0-3 |
| 4 | M | R1, R0 | MOVE BITS 4-7 to R0 |
| 5 | OUT | PIMG2 | OUTPUT IMAGE BITS 4-7 |
| | | | REFRESH ALL PRINTER CONTROLS |
| 6 | M | OUTGN,D0,2 | MOVE OUTPUT GENERATION TABLE ADDRESS IN TO DAR |
| 7 | M | OUTGN,D1,3 | |
| 8 | M | CREG1,D2 | INDEX BY CONTROL REGISTER 1 |
| 9, 10 | LD | R0,R1 | LOAD BYTE FROM OUTPUT TABLE |
| 11 | OUT | CPARS | REFRESH PRINT ALLOW AND RESET |
| 12 | M | R1,R0 | |
| 13 | T | R0,R8 | CONDITION LINE FOR IO COMMAND |
| 14 | OUT | CPRTS | REFRESH PRINT STEPPER PHASES |
| 15 | M | CREG2,D2 | INDEX BY CONTROL REGISTER 2 |
| 16, 17 | LD | R0,R2 | LOAD BYTE FROM OUTPUT TABLE |
| 18 | OUT | CSPRS | REFRESH STEPPER ENABLE LATCHES |
| 19 | M | R2,R0 | MOVE BITS 4-7 to R0 |
| 20 | T | R0,R4 | CONDITION LINES FOR IO COMMAND |
| 21 | OUT | CFRMS | REFRESH FORM STEPPER PHASES |

Detailed Operation of First Embodiment

Multiplexed Data Transfer

The data transferred in the system whether on the Data Bus Out or Data Bus In is transferred on a multiplexed basis. That is, the data is transferred in nibbles of four bits each along with a hexadecimal address which establishes the significance of the four bit nibble. This is illustrated in Table E. For example, in order to transmit 24 bits of significant information including 8 bits of printer character wire image information and 16 bits of functional information to Printer 8, 6 output cycles are required, each cycle comprising a 4 bit nibble and an associated address. Hexadecimal address "BE" along with the 4 bit nibble on the Data Bus Out shown to the right "BE" can be interpreted by the printer in four different ways depending upon the 0-1-2-3 bit configuration. Thus, a 1-1-1-0 indicates Turnoff Printer Reset, a 1-0-1-1 indicates Turnon Printer Reset, etc.

Device Logic 7

As previously indicated, FIG. 9 illustrates certain Device Logic 7 involved in the transfer of information. The address bits are provided to a Driver Block 70 on Address Bus Out lines 40a and from Driver Block 70 to lines 40b. These lines are also illustrated as inputs in FIG. 11a to connector blocks 80 which represent remote interface connections.

Referring to FIG. 9 again, the data is provided on the Data Bus Out lines 41a to Driver Block 71 and thence to lines 41b which are also shown in FIG. 11a as inputs to the interface connections 81.

OR block 72, FIG. 9, is included for diagnostic sensing of the absence of any address bits while OR block 73 is included for diagnostic sensing to determine the absence of any data bits.

The logic of FIG. 9 also provides a Gated Control Strobe signal on line 42b and an Input/Output Reset signal on line 43b, both of these lines being further illustrated in FIG. 11A in the Printer Receiver Card.

Of further interest in FIG. 9 are the lines 46a, 46b, and 47a, 47b that furnish data on the Data Bus In returning to the microprocessor 6 to indicate status and actions of the printer. Lines 46a and 47a are further shown in FIG. 11a in the lower right corner as being derived from an assembler block 83 having various inputs such as Forms Emitter A, Printer Ready, etc., through the Printer Interface Connections 84.

Printer Receiver Card

Referring now more especially to the Printer Receiver Card logic illustrated in FIG. 11a, it is noted that the Address Bus Out Information is decoded by Latch Address Decoder 51 and utilized to determine the set or reset condition of a number of Printer Drive Latches incorporated in the dashed block 85 and variously designated 90 and 91, 93–96 and 100–103. It is noted that blocks 90 and 91 actually comprise four latches in each block representing four bits of print image information. On the output side of block 85 are various gates 110, 111, and 112 and a power circuit 113 that are directed to Printer Interface connector blocks designated 120. The Printer Interface connector blocks 120 have legends alongside indicating what the print or functional operations are that they are concerned with.

To illustrate, assume that a four bit nibble is available on lines 41b, FIG. 11a, and that the hexadecimal address is "9F". Under these circumstances latches 90 will be set in the appropriate bit configuration corresponding to the data bits on lines 41b by virtue of interpretation of the address "9F" by the Latch Address Decoder block 51. This will result in the appropriate actuation of the print coils associated with print wires 1 through 4 illustrated in the upper right portion of FIG. 11a.

As another example, a data nibble comprising 4 bits on lines 41b, together with a hexadecimal address "B7" interpreted by Latch Address Decoder block 51 results in appropriate setting of latches 102 and 103 in order to establish the proper phases for driving the Print Stepper Motor indicated by the Printer Interface connections designated Print Motor A, Print Motor A Not, etc.

Timing Charts

FIG. 10a illustrates Output Timing for a single transfer of data and address information from Microprocessor 6 to Printer 8 by way of the Device Logic 7 in FIG. 9 and the Printer Logic shown in FIG. 11a. In FIG. 10a, cycle 1 is primarily a checking or preparation cycle. The information on the Address Bus Out (ABO) lines is indicated as occurring early in cycle 2 and terminating following cycle 3. Concurrently the data on the Data Bus Out (DBO) lines is established somewhat later in cycle 2 and terminates somewhat later than the Address Bus Out lines following cycle 3. The Control Strobe signal is provided late in cycle 3. A similar circumstance is encountered with respect to input addresses and data as illustrated in FIG. 10b.

To summarize, FIG. 10a represents a single setup of one group of latches in the dashed block 85, FIG. 11a. FIG. 10b represents a single input operation where two selected bits of the printers status 84, FIG. 11a, are transferred to the microprocessor 6 via the cable 10 and the Device Logic 7.

Microprocessor Operations

Microprocessor 6 provides data nibbles during transfer of data as just described, but in a succession of repetitive microprocessor operating cycles, e.g., repeat cycles, as illustrated in FIG. 10c.

It is assumed for purposes of discussion that magnets in Printer 8 require in the range of 400 to 600 microseconds in order to be set up properly to print the required character image and to perform the required functions. It is further assumed that the microprocessor has operating cycles each of which is 100 microseconds in duration. As shown in FIG. 10c, 6 microprocessor operating cycles of 100 microseconds each are established to transfer data on six different occasions during the entire interval designated "Printer Setup". Thus, 6 microprocessor operating cycles occurring in the interval represented between the lines 130a and 131a, FIG. 10c, are assumed to correspond to the Printer Setup interval between lines 130b and 131b. The printing and functional operations are assumed to occur electrically in the repeat cycle time interval represented by 133f. Actually, only a small portion, such as 15.75 microseconds, for example, represented by each of the blips 133a–133f is required in order to perform the setup operations represented by the 21 microsteps shown in Table G in conjunction with the Output Command Table shown in Table F.

To ensure accuracy of operation of the printer setup, the printer wire magnets and function magnets are actuated as a result of a multiplicity of setups operations of the latches in Block 85, FIG. 11a. This will ensure that any spurious signals, noise, and the like, will have no effect on the ultimate accuracy of operation. More specifically, as a result of microprocessor setup information, including address and data information provided during interval 133a, FIG. 10c, the latches in Block 85, FIG. 11a, are set up according to a desired printing and functional operation configuration. An initial powering has been started to operate the magnets along the sloping line 136, FIG. 10c. The latches again are set up by microprocessor action at 133b, at 133c, at 133d, and so on.

Accordingly, if an erroneous data bit due to noise or other source occurred during setup following microprocessor action in interval 133a, the correct state will undoubtedly occur during interval 133b and the erroneously activated print wire magnet or functional magnet will cease operation as represented by the line 137, FIG. 10c. As another example, a noise signal or other erroneous data signal occurring during interval 133f will result in only a flicker of response from a magnet as represented by line 139, FIG. 10c, and no operation will occur.

The presence of accurate data and accurate address information will effect operation of the magnets in Printer 8 as shown along line 136 and accurate operation of Printer 8 is thereby assured.

Microprocessor Setup Cycle

A representative microprocessor setup cycle corresponding to one of the intervals 133a, 133b, etc. in FIG. 10c comprises 21 microsteps as shown in Table G. Reference is first made to Table B for the listing of microprocessor labels and definitions together with corresponding addresses. As an example, PIMG 1 has an address of 9F and definition of "Print Wire Image High". This refers to the high numbered print wire locations 1–4. Also shown in Table B are the labels corresponding to stepper motor driving, and the input/output registers R0 and R1. Table C shows the operations codes and their meanings. Table D indicates the assignment of registers in the Data Address Register (DAR) stack 13, FIG. 3. Thus, Control Register 2 actually equates to the DAR location D13. Control register 1 equates to DAR register D15. Table E has been described in connection with the Multiplexed Data Transfer operation section herein. As a reminder, it illustrates the addresses and data involved in transfer of significant information from Attachment 4 to Printer 8.

Description of Tables F and G

Table F is a table stored in the microprocessor that is used to generate output commands during the microprocessor setup operation represented in Table G. Its use will become more apparent by review of the microsteps 1-21 in Table G.

Microsteps 1, 2, 3, 4 and 5

During microstep 1 a load absolute instruction is executed to load Registers R0 and R1 with the print image required for the print wires in Printer 8. During cycle 3 an output occurs on the Data Out Bus 41, FIG. 3, which equates to bit patterns on lines 41a and 41b resulting in the print image setup of latches in Latch Block 90, FIG. 11a. This occurs as a result of the loading of A Register 20 with the four bits in the R0 register in Stack 13, FIG. 3. Microstep 4 involves moving data from Register R1 into R0. Subsequently, the 4 bit nibble in Register R0 is outputted during microstep 5 to latches 91, FIG. 11a. The five microsteps 1, 2, 3 4, and 5 thus result in refreshing the wire image in Printer 8.

Microsteps 6-21

Microsteps 6-21 are involved in the refreshment of all printer Motor Drivers. Microsteps 6 and 7 involve setting registers D0 and D1 in the DAR stack 13, FIG. 3, with the high order two nibbles of the address of the Output Command Table shown in Table F that is maintained in storage 15, FIG. 3. Microstep 8 involves a Move Instruction and effects an indexing operation determined by the value in Control Register 1 which completes the address of the proper data pattern to cause particular functions to happen in the printer. In Microstep 9, 10 Registers R0 and R1 are loaded with the data pattern to cause the desired functions in the printer. A 4 bit nibble is then outputted to the facility of CPARS a label equated to the address "BE" which, by inspection of Table E, involves the Printer Reset and Printer Allow latches 93 and 94, FIG. 11a. In microstep 12 the contents of Register R1 are moved into Register R0 and in microstep 13 a test interval occurs merely to allow the cable address lines to settle down. In microstep 14 the contents of Register R0 are outputted to set up the Print Stepper Motor phases by means of latches 102 and 103, FIG. 11a. Similar action occurs in microsteps 15-21 involving the Forms Stepper Motor controlled by latches 100 and 101, FIG. 11a, and in this fashion all of the latches in block 85, FIG. 11a, are set up with the proper code configurations required for printing and functional operations.

As previously indicated, the foregoing 21 microsteps occur during each of the intervals 133a, 133b, and so on in FIG. 10c. The execution of the 21 microsteps takes 15.75 microseconds. The remaining approximate 84 microseconds before the next repeat cycle is used by the microprocessor 6 to transfer data to or from the channel logic 5 and CPU 1 and also to make decisions as to what hammers or magnets should be turned on in the next repeat cycle. It should be noted that turning a magnet driver off is as significant as turning one on. As long as power is applied to the Printer Adapter Card these Repeat cycles are continuously executed. If no printer action is currently required the repeat cycles will be continuously setting all outputs to the off or inactive state. When a print wire is to be fired the repeat cycles will set the print wire driver on. During the idle or off time between wire fires, the repeat cycles will be setting the print wire driver off.

A highly accurate and efficient scheme of data transfer and operation is thereby achieved.

Detailed Description of Second Embodiment

The principles of operation and circuit actions just described are equally effective in connection with operation of the line printer shown in FIG. 12. In this case, however, since no print wire magnets are involved and only a single print hammer for each location to be printed, the repeat cycle operation is applied instead to the operation of indicators and other elements in the printer rather than print magnets. Reference is made to FIG. 11a and particularly to line 150 which is repeated in FIG. 11b. In order to effect operation of the line printer in FIG. 12 with the repeat cycle kind of operation, the Printer Interface connections 151 shown in FIG. 11b for the Belt Line Printer of FIG. 12 are merely substituted for the Printer Interface connections 120 in FIG. 11a along line 150. This involves a one-for-one substitution of interconnections in most cases except for the lowermost area where, instead of having two Data Bus In (DBI) interface connections, five interface connections are provided representative of lines 0, 1, 2, 3, and 4 for the printer of FIG. 12.

Of special interest in FIGS. 11b and FIG. 12 are the interface connections and indicators involving Ready, Printer Check, and Forms Check which have to do with energization of lamps 160, 161, and 162, respectively. These are assumed to be actuated by virtue of inputs to indicator connections 165, 166, and 167 by virtue of signals on bus 170 provided from the control latches in block 171. This block is set up as a result of data and address information provided in a manner analogous to that previously described in connection with the first embodiment.

For convenience, the elements involved in operation of the Line Printer in FIG. 12 are described below.

Line Printer

The printer is readily connected by the appropriate device attachment to an IBM Series/1 Processor.

Printer Features

The printer:
Is available in two models, 1 and 2, to provide various printing speeds.
Uses a print belt of various character set lengths.
Uses EBCDIC 64-character set.
Is controlled by a cycle stealing attachment.
Prints up to 132 characters per line (cpl).
Prints 10 characters per inch (cpi).
Spaces 6 or 8 lines per inch (lpi).
Has paper jam detection.
Has variable width forms tractor.
Has a forms stand (model 1).
Has a forms stand enclosure (model 2).
Has a control panel consisting of Ready, Printer Check, and Forms Check indicators and three switches for Space, Restore, and Enable/Disable.

The print speed of Models 1 and 2 is dependent on the character set length (number of characters in the set). The following chart shows the line per minute speeds of the two models for the various character set lengths available:

| Character Set | Model 1 | Model 2 |
| --- | --- | --- |
| 48 | 155 LPM | 414 LPM |
| 64 | 120 LPM | 300 LPM |
| 96 | 80 LPM | 235 LPM |

| Character Set | Model 1 | Model 2 |
|---|---|---|
| 128 | 40 LPM | 160 LPM |

Printer

The printing unit consists of a platen 182, the print belt 181, ink ribbon 184 and print hammers 186 (66 print hammers for model 1 and 132 print hammers for model 2). Printing is accomplished by the print hammers which selectively force the paper 190 against the inked ribbon 184 and print belt 181. The print hammers are selected through the belt translator when the desired character on the belt is in the correct print position.

Carriage

Printer 180 has a pin feed carriage 191 which will handle up to six part forms. The carriage moves the forms at either 6 or 8 lines per inch (lpi) under program control. Forms may also be skipped under program control at the rate of 12 inches per second.

Console

The printer console 195 has the following:
1. Indicators
    Ready lamp 16. The printer is ready to execute system commands.
    Printer Check lamp 161. An error has occurred during a print operation.
    Forms Check lamp 162. Either there are no forms in the printer or the forms failed to move under program control.
    Typically the "lamps" are Light Emitting Diodes (LED) elements.
2. Switches
    Enable/Disable Switch 200. When in the Enable position, the printer will accept and execute commands from the system. The switch must be in the Enable position to print. To make the printer Not Ready, place this switch in the Disable position. To reset an error, move the switch to Disable then to Enable.
    Carriage Restore Switch 201. The carriage is positioned to line one of the forms. This switch is only active when the printer is Not Ready. The cover must be closed to move the forms to line one.
    Carriage Space Switch 202. The carriage moves the forms one space. This switch is active only when the printer is Not Ready. Pressing the carriage space also causes the ribbon and print belt to move.
    Power Switch 203. Turns mainline power to the printer on or off. This switch is located on the front of the printer stand.

Data Transfer Operations

Data is transferred between the processor and the device attachment, in a parallel operation (16 data bits plus 2 parity bits). The number of data words transferred and the direction in which they move on the channel is determined by the I/O command. The I/O command also determines whether data is transferred to or from main storage, under Direct Program Control (DPC) or in Cycle Steal (CS) mode.

Direct Program Control (DPC)

When data is transferred under direct program control, only one word of immediate data moves to or from main storage. After moving the immediate data, the processor continues processing other instructions.

Cycle Steal

When data is moved to or from main storage by a Cycle Steal Operation (stealing storage cycles), processing and I/O operations are overlapped. Overlapping allows the processor to execute other instructions while the printer is performing I/O operations.

Operate I/O Instructions

All input/output operations from the processor to the printer are initiated by an operate I/O instruction. An address field (bits 16–31) and the R2 field (bits 8–10) in the Operate I/O instruction point to a processor storage location containing an Immediate Device Control Block (IDCB).

The IDCB is a two-word block of storage that contains the device directed I/O commands. Before issuing the I/O instruction for an operation, the command field of the IDCB (Bits 0–7) must be set, along with a device address (bits 8–15), and any field of immediate data required by the command in the IDCB (bits 16–31). The information specified in the immediate field depends on the command to be performed.

Line Printer Operation

Associated with the Belt Printer 180 in FIG. 12 are the Printer Adapter Card 4a and the Printer Receiver Card 9a that are similar to cards 4 and 9, previously discussed. Adapter Card 4a incorporates a Data Buffer 220 receiving data information on bus 221 together with an associated Belt Translator block 222 determining the proper characters to be printed under control of microprocessor 225, which is analogous to microprocessor 6. Data is outputted from Card 4a to Card 9a by Data Bus Out lines 226 corresponding to the Data Bus Out, previously discussed. Address information is supplied for setting Control Latches 171 by line 227. Printer Receiver Card 9a in addition to Control Latches 171 incorporates the Hammer Fire Control block 230 and Sense Latches 231 which receive feedback information from Printer 180 for transfer to Adapter Card 4a by way of Data Bus In 233.

other elements of interest in FIG. 12 include the diagnostic indicators 240 for use in diagnosing the status of Printer 180. Blocks 242 and 243 are involved in actuation of Carriage Motor 245 in Printer 180. Upper Paper Clamp 250 and Lower Paper Clamp 251 are activated under control of the Driver Block 252. The driving of belt 181 is controlled by blocks 255 and 256. A ribbon solenoid driver block 257 is provided to stop ribbon 184 movement to prevent smudging. Hammers 186 are controlled by block 260. Impression is controlled by potentiometer 261 feeding a single shot 262 that inputs block 230. A print transducer 270 in conjunction with a Print Scan Control Block 271 determines a number of things including the home position on belt 181, whether or not the belt is up to speed. The print location on belt 181 as determined by timing marks 275, all of the foregoing having to do with the location of the proper character for printing. Status of the indicators and switches in console 195 is manifested by bus 278.

Typical Operating Characteristics

The timing shown in FIG. 10c shows only the period activating a print wire driver. A print wire can fire one time in approximately 18 repeat cycles. (~ 30% duty cycle). Typically, before the print wire firing shown in FIG. 10c is repeated, there could be 12 repeat cycles turning off the print wire driver.

In the case of the print wire magnets, approximately four repeat cycles with the magnet driver turned on (in a 600 microsecond period) are typically required to impart enough energy to the print wire to produce a dot on the paper. In the case of indicators, a continuous error rate of approximately 25% of the repeat cycles would be required to produce a noticeable difference to the eye of an observer. It should also be noted that between print wire fire times, repeat cycles are taking place which turn off the wire magnet drivers.

The definition of "multiplicity" is a function of the operating element. In the case of an indicator 100 consecutive errors would not be seen. On a print wire driver two errors out of 6 repeat cycles would still produce the desired print results. Three errors out of 6 repeat cycles would produce indeterminate results, but are not normally encountered.

SUMMARY

From the foregoing, it is believed evident how the multiplexed data transfer and repeat cycle operation is readily adapted for activation of the indicators 160, 161, and 162 in Printer 180, FIG. 12, as required during operation of the system.

Accordingly, the principles of the present invention are applicable to a wide variety of applications and are adaptable in any situation where highly reliable operation of relatively slow moving masses or visual indicators is required in a system of this nature.

While the invention has been particularly shown and described with reference to preferred embodiments thereof, it will be understood by those skilled in the art that various changes in form and detail may be made therein without departing from the spirit and scope of the invention.

What is claimed is:

1. A data transfer arrangement for a data system, comprising:
    a device controller, said controller providing data in successive controller cycles of operation representative of information to be printed;
    a printer, said printer incorporating storage elements for storing data and operating elements operable in successive printer cycles to print information or perform functions, each of said printer cycles encompassing a minimum number of controller cycles numbering at least two controller cycles up to a preselected number greater than two controller cycles;
    interconnection means for interconnecting said controller and said printer;
    transfer means for effecting transfer of individual desired signal patterns of data from said controller to said printer, the majority of said signal patterns being transferred to said printer substantially in an errorfree form during continuing operation of said system but an individual signal pattern occasionally being transmitted erroneously; and
    repeat cycle means in said system for repetitively transmitting each individual signal pattern of data from said controller to said printer for said minimum number of controller cycles in order to set up said printer storage means and operate said operating elements in accordance with said majority of transmitted errorfree signal patterns representing each individual data signal pattern and effectively minimizing response in said system to the occasional erroneous signal patterns.

2. The data system of claim 1 wherein said data source includes a microprocessor, and further comprising:
    a host processor, said host processor providing data and instruction signals to said microprocessor for control of said printer.

3. The data system of claim 1, wherein:
    said operating elements having a relatively slower response time in relation to the speed of operation of said controller; and further comprising
    driving means connecting said storage elements to said operating elements, said driving means providing driving impetus to said operating elements in accordance with signal patterns in said storage elements.

4. The data system of claim 3 wherein:
    said operating elements comprise print selection magnets.

5. The data system of claim 3 wherein:
    said operating elements comprise indicator lamps.

6. The data system of claim 3 wherein:
    said printer comprises a serial matrix printer incorporating a plurality of print wires; and wherein
    said operating elements comprise associated wire operating coils for said print wires.

7. The data system of claim 3 wherein
    said printer comprises a belt printer; and wherein
    said operating elements comprise associated printer indicator lamps for indicating status of said printer.

8. The data system of claim 3, further comprising:
    status means for providing an indication of status of said printer to said controller.

9. The data system of claim 1, further comprising:
    an adapter circuit card incorporating said controller, said adapter circuit card further incorporating additional device logic;
    a utilization receiver circuit card associated with said printer, said receiver circuit card incorporating said storage elements and further incorporating utilization logic circuitry for said printer; and
    multi-wire cable means in said interconnection means connected between said adapter circuit card and said receiver circuit card.

10. The data system of claim 1 wherein said interconnection means comprises a data cable having a plurality of wires less in number than the number required for transfer of a complete said signal pattern, and further comprising:
    address wires incorporated in said interconnection means; and
    address response circuits in said printer;
    multiple data transfer means operable in a succession of data transfer cycles to transfer portions only of each complete said data pattern and to also transfer address patterns associated with each of said portions, and representative of selected ones of said storage elements; and
    storage decode means in said printer responsive to said address patterns to transfer the data portions into the storage elements determined by said address patterns whereby complete signal patterns are transferred to said storage elements in a multiplicity of cycles of operation.

11. A signal transfer arrangement, comprising:

a signal source, said source providing signals in successive source cycles of operation;

a utilization device, said utilization device incorporating storage elements for storage signals and operable in successive cycles, each of said device cycles encompassing a minimum number of source cycles numbering at least two source cycles up to a preselected number greater than two source cycles;

interconnection means for interconnecting said source and said device;

transfer means for effecting transfer of individual desired signal patterns from said source to said device, the majority of said signal patterns being transferred to said device substantially in an error-free form during continuing operation of said system but an individual signal pattern occasionally being transmitted erroneously; and repeat cycle means in said system for repetitively transmitting each individual signal pattern from said source to said device for said minimum number of source cycles in order to set up said device storage means, and operate said device in accordance with said majority of transmitted error-free signal patterns representing each individual signal pattern and effectively minimizing response in said system to the occasional erroneous signal patterns.

12. The system of claim 11 wherein said signal source includes a microprocessor, and further comprising:

a host processor, said host processor providing data and instruction signals to said microprocessor for control of said device.

13. The system of claim 11 further comprising:

operating elements in said device for effecting desired operations, said operating elements having a relatively slower response time in relation to the speed of operation of said controller; and driving means connecting said storage elements to said operating elements, said driving means providing driving impetus to said operating elements in accordance with signal patterns in said signal patterns in said storage elements.

* * * * *